United States Patent [19]
Graham

[11] Patent Number: 6,027,214
[45] Date of Patent: Feb. 22, 2000

[54] DETACHABLE CORRECTIVE LENS ASSEMBLIES

[76] Inventor: Deborah L. Graham, 304-33rd Ave. E., Seattle, Wash. 98112

[21] Appl. No.: 09/023,358

[22] Filed: Feb. 13, 1998

[51] Int. Cl.[7] .................................................. G02C 7/08
[52] U.S. Cl. ............................................. 351/57; 351/41
[58] Field of Search ............................. 351/57, 47, 168, 351/172, 45, 46, 61

[56] References Cited

U.S. PATENT DOCUMENTS

| | | | |
|---|---|---|---|
| 3,033,359 | 5/1962 | Mercer | 351/47 |
| 4,511,226 | 4/1985 | Freeman | 351/57 |
| 4,898,459 | 2/1990 | Eriksson | 351/46 |
| 5,118,178 | 6/1992 | Tuckman | 351/57 |
| 5,123,724 | 6/1992 | Salk | 351/57 |
| 5,464,094 | 11/1995 | La Haye | 206/316.1 |
| 5,642,177 | 6/1997 | Nishioka | 351/47 |
| 5,880,805 | 3/1999 | Naessens et al. | 351/57 |

FOREIGN PATENT DOCUMENTS 9516220  6/1995  WIPO .

OTHER PUBLICATIONS

Shades with a natural attraction, Fashion section of The Philadelphia Inquirer, Jul. 13, 1997.
Ray–Shield Clip–On Glasses, www.aadcomed.com Catalog Excerpt.
Read by the Pool Without Squinting, with Incredible Removable Reading Lenses for Your Sunglasses, Catalog Excerpt.
e∩clips®, Custom clip–on sunglasses, www.clipon.com, 1998.
A. Orvis Super Magnifiers and Magnifying Clip–On, Tools and Gadgets, Catalog Excerpt.
Carl Zeiss, Galilean Telescopic Loupe System—G3 Loupe, www.zeiss.com, Catalog Excerpt.
Carl Zeiss, 2.3× Galilean Spectacle Frame Loupes, *Miller Optical Instruments, Inc. New Product Introduction Press Release and attachment*, Mar. 1998.

*Primary Examiner*—Huy Mai
*Attorney, Agent, or Firm*—Ann W. Speckman; James Klaniecki

[57] ABSTRACT

A lens assembly is provided that modifies the visual correction provided by a pair of base eyeglasses, in some fashion, when it is quickly, conveniently and detachably mounted to the base eyeglasses. The lens assembly uses a clip-on, magnetic or other detachable mounting arrangement. The lens assembly may incorporate corrective lenses provided in various placements for applications such as specialized occupational applications.

17 Claims, 5 Drawing Sheets

DETACHABLE CORRECTIVE LENS ASSEMBLIES

FIELD OF THE INVENTION

The present invention relates generally to detachable lens assemblies that, when detachably mounted to a conventional pair of base eyeglasses, modify the visual correction provided by the base eyeglasses.

BACKGROUND OF THE INVENTION

Corrective lenses may be provided in many forms for correcting a variety of vision deficiencies and impairments and to suit various needs and applications. Rigid corrective lenses constructed from glass or plastics are traditionally mounted in eyeglass frames worn by an individual. Various types of contact lenses have been developed in recent years that provide a rigid or flexible corrective lens that contacts the eye of the wearer directly. Eyeglasses and contact lenses provide satisfactory optical correction and convenience under many circumstances.

Many individuals require more than one type of optical correction. As individuals age, for example, they frequently require optical correction, i.e. magnification, for reading applications, as well as optical correction for seeing well at distances. An individual requiring multiple optical corrections may use two or more pair of eyeglasses, each providing a different optical correction for a particular application. This approach is inconvenient, requiring an individual to carry two or more pair of eyeglasses and change eyeglasses, depending upon whether the individual is reading, looking at a distance, etc. In many circumstances, an individual needs to see at a distance and read intermittently, so that maintaining, transporting and changing two or more pairs of eyeglasses is impractical.

Eyeglasses having bifocal and trifocal corrective lenses have been developed in an effort to provide a convenient solution in which a single pair of eyeglasses may be used for distance, intermediate and reading applications. The prescriptive lens for reading is generally placed in the lower region of the lens, while the prescriptive lens for seeing at distances is placed in an upper and/or central region of the lens. Various arrangements of lenses, including placement of a prescriptive lens for reading in an upper region of the lens, have also been provided in bi- or multi-focal lenses for specialized occupational applications. Wearing a single pair of eyeglasses having multiple corrective lenses of this type is more convenient than changing eyeglasses each time a different optical correction is required.

Many individuals, however, have difficulty adjusting to bifocal or trifocal lenses. Lenses providing multiple corrections in different regions do not provide a full field of view for any correction. There may be serious safety issues, for example, when an individual wearing conventional bifocal or trifocal lenses goes up or down stairs or needs to navigate curbs or other uneven terrain. Conventional bifocal and trifocal lenses are also not well suited for recreational or sporting activities such as hiking, skiing, playing various sports, and the like. To participate in these activities, an individual may need to purchase and transport additional eyeglasses. This is both inconvenient and expensive. There thus are many situations in which bifocal or trifocal lenses are not optimal and having multiple pairs of eyeglasses may be desirable or necessary.

The eyeglass situation is further complicated by the desirability of having lenses that are protective, such as those provided in sunglasses, particularly for sporting and outdoor recreational activities. Many individuals elect to purchase prescription sunglasses having a single type of corrective lens to correct, for example, distance vision. These eyeglasses are suitable for sporting and recreational activities, but cannot be used for other activities requiring a different correction, such as reading.

Detachable clip-on lenses have been developed to "convert" eyeglasses having single or multiple corrective lenses to sunglasses. Generally speaking, clip-on lens assemblies having tinted or polarized or UV-protective lenses are a convenient and cost-efficient approach to satisfying multiple optical requirements. The detachable lens assembly may employ a mechanical clip, magnets, or other means to permit removable mounting to conventional eyeglasses. Clip-on radiation shielding lenses that "convert" prescription eyeglasses to radiation protective prescription eyeglasses have also been used.

Specialized magnifying lenses have been designed for use in professions such as surgery, jewelry making and repair, and the like. Such specialized lenses are mounted in a housing that may be mounted to a pair of base eyeglasses on a bar extending from the eyeglass frames. Such specialized lenses may be flipped up or pivoted out of the way at times when the specialized correction is not required. This system is cumbersome and inconvenient.

U.S. Pat. No. 3,033,359 discloses a disposable lens shield constructed from an electrostatic-type of transparent plastic which adheres readily to an eyeglass lens when placed in contact with the lens. The lens shield may be tinted with a dye to reduce transmission of harmful light rays and, thus, prescription-ground eyeglasses may be converted quickly, easily and economically into prescription-ground sunglasses. The disposable lens shield may also be used to protect the eyes of industrial workers from foreign particles and to protect glasses or goggles from materials such as paint.

PCT International Application PCT/US94/14271 discloses aliphatic thermoplastic polyurethane "press-on" lenses that are permanently but releasably adhered to base eyeglasses. The lenses are optically clear and can be adhered to sunglasses or other plano (non-prescriptive) lenses using molecular surface adhesion to mount magnifying or corrective lenses to eyeglasses. The lenses are removable from the base eyeglasses only with considerable effort. The press-on lenses are generally applied to the inner surface of the rigid lens of eyeglasses or sunglasses to provide a correction, such as a magnification. Thus, eyeglasses may be "converted" to bifocals or trifocals by applying one or more detachable thermoplastic polyurethane lenses. A plurality of magnifying or corrective polyurethane lenses may be mounted on the surface of a base lens. In one embodiment, detachable thermoplastic polyurethane lenses are applied to both the inner and outer surface of a lens in an orientation such that the applied lenses are twisted or rotated in relation to one another to provide correction for an astigmatism. Placement of the detachable lenses are illustrated in conventional arrangements, with magnifying corrective lenses applied on the lower and lower-central area of the base lens.

U.S. Pat. No. 5,464,094 similarly discloses stick-on lenses designed to adhere to the interior surface of the lenses of a pair of sunglasses or non-corrective eyeglasses. Packaging containers for displaying the stick-on lenses are also disclosed.

Many occupations require individuals to read information presented on a vertically oriented panel or display, or at a level even with or higher than eye level. Radiologists, anesthesiologists, surgeons, and many types of medical technologists, for example, need to read films, computer screen image and data displays, various instruments, and the like that are displayed vertically. Similarly, airline pilots, mechanics, plumbers and many medical personnel are required to read information or instruments or see work displayed at a level even with or higher than eye level. Also, computer workstations are generally arranged so that a generally vertically oriented computer monitor is placed even with eye level or slightly lower than eye level.

Use of conventional bifocal corrective lenses in situations where the displayed or reading material is presented on a generally vertical display or is even with, higher than or even slightly lower than the individual's eye level requires the individual to tilt his or her head and neck in an uncomfortable position to view the displayed or reading material through a conventional bifocal corrective magnifying lens placed in the lower region of the lens. Repetitive and serious neck strain and back problems are common among health care workers, computer users, and other individuals whose occupations require such unnatural positioning of the head and neck.

Another problem that is particularly acute in occupational settings is that conventional corrective lenses, such as bifocals, are typically designed for reading at a particular distance, i.e. 18 inches, which may not be a suitable distance in an occupational setting. Computer monitors and other types of vertical displays, for example, are frequently arranged a greater distance from the user's eyes, and the conventional corrective lenses provided for reading frequently are not suited for viewing such displays. The individual tends to lean forward under these circumstances, aggravating neck and back problems. It would be useful, therefore, to provide an intermediate strength corrective lens that can be used for such applications but that is not otherwise useful in daily wear eyeglasses.

SUMMARY OF THE INVENTION

The present invention is directed to lens assemblies that may be quickly, conveniently and detachably mounted on and removed from conventional prescription or non-prescription eyeglasses to modify the optical correction used by an individual. The lens assemblies of the present invention are particularly well suited for specialized occupational applications where an individual requires correction in a different spatial location or of a different strength or type than is provided in conventional, daily wear eyeglasses. An individual may use conventional, daily wear "base" eyeglasses for activities for which those eyeglasses are well suited, and then for applications requiring specialized vision correction, the individual may quickly and conveniently mount (and remove) the detachable lens assembly of the present invention, incorporating corrective lenses, adjacent the exterior or interior surfaces of the lenses in the base eyeglasses. When the individual returns to activities for which the conventional base eyeglasses are well-suited, he or she removes the specialized lens assembly and stores it for future use. Intermittent removal, such as to speak to another nearby person or to walk away from the desk, is easily accomplished with simple reapplication when returning to the task.

According to one embodiment of the present invention, a lens assembly is provided in the form of corrective lenses mounted in a frame that may be conveniently and detachably mounted on a conventional pair of eyeglasses. An assembly conventionally known as a "clip-on" frame is commonly used to "convert" daily wear eyeglasses to sunglasses, for example, by mounting light and glare shielding or UV-protective lenses in a frame attachable to the base eyeglasses by means of hooks or clips. Detachable frames may also be mountable on conventional daily wear eyeglasses using a magnetic arrangement. Any arrangement of a detachable, magnetic or clip-on frame may be used in the lens assembly of the present invention. According to preferred embodiments, the detachable frame is easily mountable on and quickly and easily removable from the exterior surface of a conventional pair of base eyeglasses, providing a high level of convenience.

The lens assembly of the present invention may incorporate corrective lenses provided in a specialized placement for specialized applications, such as various occupational applications. According to one embodiment, for example, a detachable lens assembly incorporates corrective lenses such as bifocal or trifocal lenses in an upper or upper central region of the lens. When such a lens assembly is mounted on conventional daily wear eyeglasses, an individual who requires magnification to see clearly at relatively close distances is able to view displayed images at an intermediate distance on a generally vertical display screen, or to view material when it is at or above eye level, without neck or back strain. A lens assembly of this type providing magnification in an upper and/or upper central region of the lens may be quickly and conveniently mounted over conventional corrective eyeglasses, including bifocals or trifocals, for specialized applications, and then equally quickly and conveniently removed when the user no longer requires specialized correction. For example, a radiologist may mount a lens assembly of the present invention having correction in an upper and/or central region of the lenses over his/her daily wear single prescription or multi-focal eyeglasses to view films on a vertical display panel and immediately remove the lens assembly and return to the daily wear eyeglasses to consult with a colleague or technologist as well as to visit patients or take part in other personal or professional activities. Similarly, a computer user may attach a lens assembly of the present invention to his/her daily wear eyeglasses to provide a specialized intermediate correction for viewing the computer screen at an intermediate distance. When the computer user is not using the computer, the lens assembly may be quickly and conveniently removed to provide appropriate correction with the daily wear base eyeglasses.

Although the detachable corrective lens assembly of the present invention is particularly suitable for providing modified visual correction for specialized occupational applications, it may be used in any application where visual correction different from that provided in daily wear corrective or non-corrective eyeglasses is required. Thus, for example, a corrective lens assembly having a corrective lens providing magnification may be conventionally positioned in a lower or lower central portion of the lens. Such a corrective lens assembly may be used to effectively and temporarily convert daily wear eyeglasses to "bifocals" or "trifocals" for reading and intermediate distance applications. Individuals using such a system may simply mount the detachable lens assembly on their daily wear eyeglasses when reading and then remove the lens assembly, leaving the daily wear eyeglasses unaltered for other applications. While the lens assembly of the present invention is generally used with a pair of base eyeglasses having corrective lenses, the lens assembly may also be mounted on a pair of base eyeglasses that has plano, or non-corrective lenses, such as non-prescription sunglasses or safety glasses, to provide correction to the pair of base eyeglasses.

For many applications, lens assemblies of the present invention comprise composite or multi-focal lenses for specialized occupational or reading applications. Lens assemblies may also be provided where each lens has a single corrective power. A lens assembly having magnifying lenses may be mounted on corrective or non-corrective base eyeglasses, for example, to "convert" them to reading glasses or specialized occupational eyeglasses. Specialized lens assemblies with magnifying lenses in the lower part of the lens may be mounted adjacent to existing eyeglasses, including bifocals, to provide additional correction or magnification for more close-up applications such as surgery, jewelry making and repair, sewing, handicrafts, and the like. Other types of corrective lenses may also be provided by the lenses incorporated in the lens assemblies of the present invention.

An important feature of the lens assemblies of the present invention is that they modify the visual correction provided by a pair of base eyeglasses, in some fashion, when they are quickly and conveniently mounted to a pair of base eyeglasses. The lens assemblies are also quickly and easily detached from the base eyeglasses to restore the visual correction provided by the base eyeglasses.

DESCRIPTION OF THE FIGURES

Preferred embodiments of the detachable corrective lenses of the present invention will be described with reference to the figures, in which.

DESCRIPTION OF PREFERRED EMBODIMENTS

Figure 1:
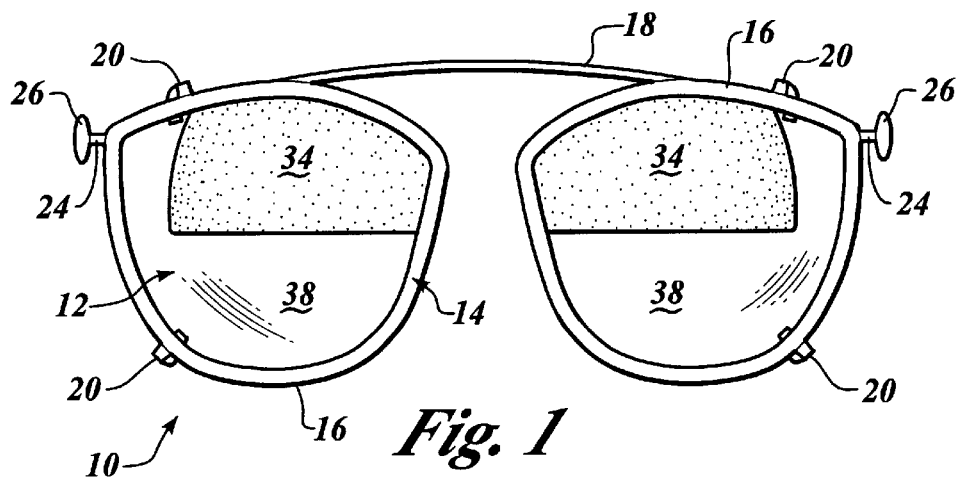
FIG. 1 illustrates a front view of a lens assembly of the present invention comprising composite lenses mounted in a clip-on lens frame that is detachably mountable to a pair of base eyeglasses by means of the mechanical clips.

FIG. 1 illustrates a lens assembly 10 of the present invention in which corrective lenses 12 are mounted in a frame 14 adapted for clip-on attachment to a pair of base eyeglasses. Corrective lenses 12 are preferably generally similar in configuration and dimension to the lenses mounted in the base eyeglasses to which lens assembly 10 is adapted to be detachably mounted. Frame 14 comprises two lens holders 16 mounted on and attached to one another by means of a bridge piece 18. Frame 14 is preferably generally similar in configuration and dimension to the frame of the base eyeglasses. Frame 14 is also provided with a plurality of clips 20 for detachably mounting the frame and lenses forming lens assembly 10 on a pair of base eyeglasses. Many different types of clip-on frames are available, and the lens assemblies of the present invention may utilize any type of frame that is easily and conveniently detachable from a pair of base eyeglasses.

Figure 2:
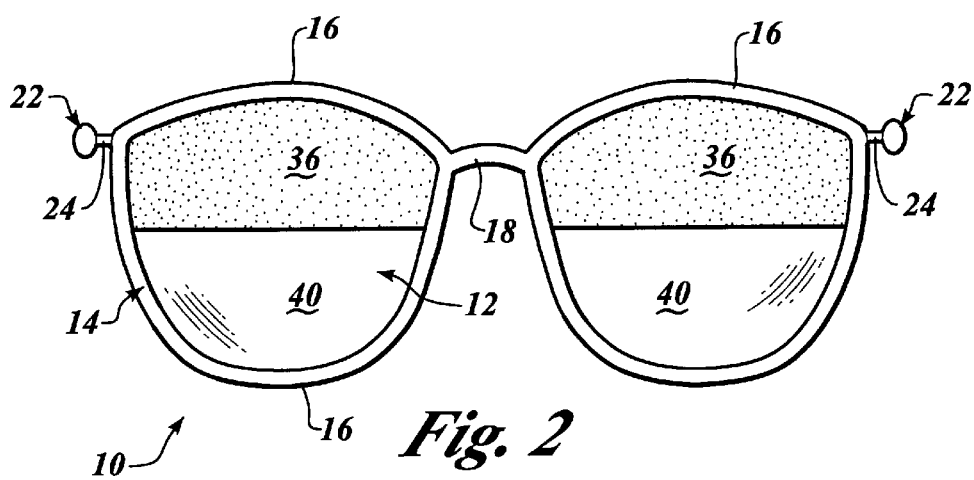
FIG. 2 illustrates a front view of a lens assembly of the present invention comprising composite lenses in an "executive" style mounted in a lens frame that is detachably mountable to a pair of base eyeglasses by means of a magnetic mechanism.
Figure 10:
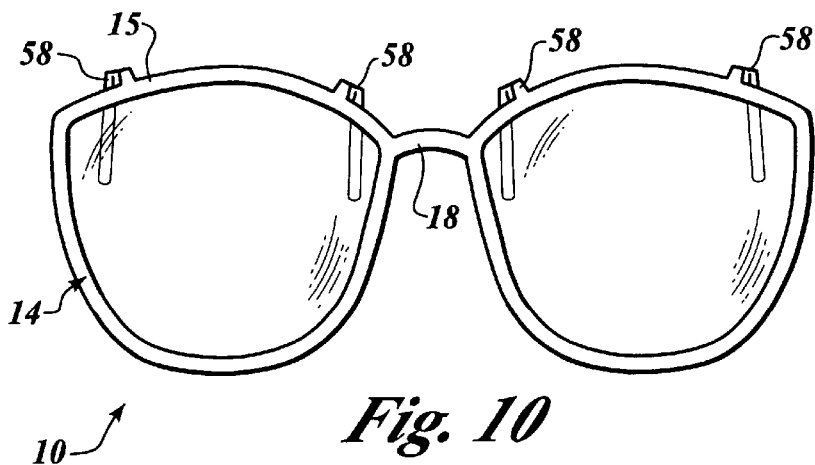
FIG. 10 illustrates a front view of a lens assembly of the present invention comprising a lens frame that is detachably mountable to a pair of base eyeglasses by means of a clip arrangement.
Figure 11:
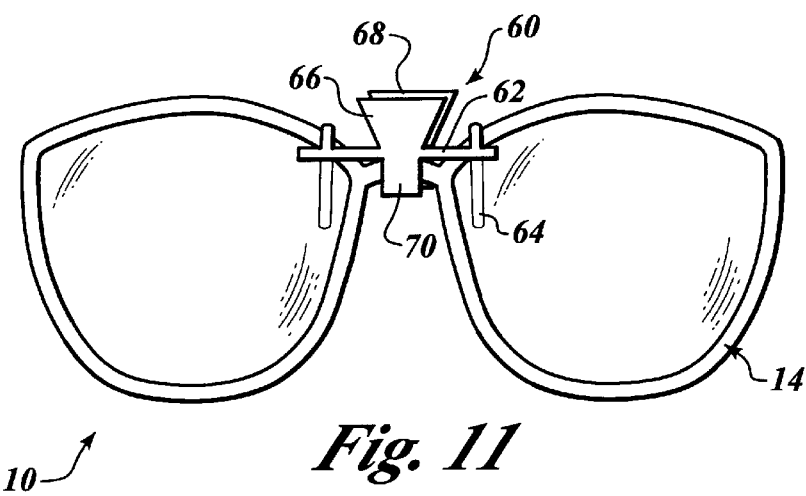
FIG. 11 illustrates a front view of a lens assembly of the present invention comprising a lens frame that is detachably mountable to a pair of base eyeglasses by means of a central pinch clip.
Figure 12:
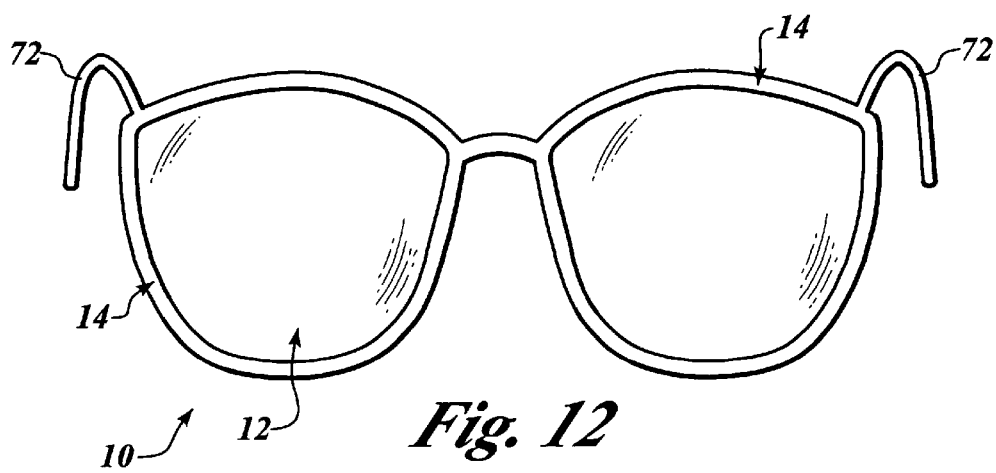
FIG. 12 illustrates a front view of a lens assembly of the present invention comprising a lens frame that is detachably mountable to a pair of base eyeglasses by means of hooks mountable on the temples of the base eyeglasses.

FIG. 2 illustrates an alternative type of frame having corrective lenses 12 mounted in frame 14 comprising two lens holders 16 mounted on and attached to one another by means of bridge piece 18. As illustrated in FIGS. 1 and 2, bridge piece 18 may be mounted at various locations in lens holders 16. Rather than mechanical clips 20, as provided in the embodiment illustrated in FIG. 1, lens assembly 10 of FIG. 1 has magnetic extension 22 that, in combination with corresponding magnetic means provided on the base eyeglasses, provides easy and convenient removable attachment of the lens assembly to base eyeglasses. Magnetic detachable frames are known in the art. Other types of attachment mechanisms, examples of which are illustrated in FIGS. 10–12, may also be used with the lens assemblies of the present invention.

FIGS. 1 and 2 illustrate a preferred feature of lens assemblies of the present invention in which an extension 24 projects from the "outside" periphery of each of the lens holders 16, generally as shown, with an enlarged portion 26 provided on the lateral end of the extension. When the frame employs a magnetic mechanism 22 for removable detachment to the base eyeglasses, the magnetic mechanism may be mounted at the end of extension 24, as shown in FIG. 2.

Extension 24 in combination with enlarged portion 26 or magnetic mechanism 22 provides a convenient mechanical means for attachment of an eyeglass leash or similar device. Thus, a lens assembly 10 may be attached to a leash at one or both of the extensions 24 so that the lens assembly is accessible when it is not in use. Additionally, extensions 24 provide a convenient "handle" for attaching and detaching the lens assembly to/from eyeglasses.

An important feature of the lens assembly of the present invention is that lenses 12 are corrective lenses that, when mounted on a pair of base eyeglasses, provide visual correction that is in some way different from the correction (if any) provided by the base eyeglasses. Lenses 12 may have a single type of correction in what is referred to herein as a "unitary" lens. FIG. 5 illustrates an embodiment wherein unitary corrective lenses 25 are mounted in frame 14. Alternatively, lenses 12 may comprise multiple corrective elements or one or more corrective elements combined with one or more plano (non-corrective) elements in what is referred to herein as a "composite" lens. FIGS. 1–4 and 6–9 illustrate embodiments wherein composite corrective lenses are mounted in frame 14 and will be described in greater detail below. The corrective lenses may provide various types of correction. Magnification may be desired for some applications; corrective lenses having different focal distances may be desired for other applications; and lenses correcting astigmatisms may be suitable for yet other applications.

FIGS. 1–4 illustrate lens assemblies of the present invention comprising composite lenses. FIGS. 1 and 2 illustrate corrective lenses 12 comprising corrective lens portions 34 and 36, respectively, and plano lens portions 38 and 40, respectively. The configuration and placement of corrective lens portions 34 and 36 in a central and upper location within each lens holder, with plano lens portions 38 and 40 in a central and lower location within each lens holder, is well suited for applications where an individual needs additional or different corrective lenses when looking at a vertical display screen or when looking at objects generally at or slightly above eye level. A lens assembly having magnifying lens portions 34 or 36 may be removably mounted on base eyeglasses for use by medical professionals requiring magnification for close viewing of a vertical display screen or information or instruments generally at or above eye level, for example. The lens assembly may be quickly and conveniently removed from the base eyeglasses when the individual engages in activities that don't require the specialized correction.

The configuration of corrective lenses 36, as illustrated in FIG. 2, is referred to as an "executive" style. In this configuration, corrective lens 36 generally extends across the full width of lens holder 16. The precise configuration and placement of corrective lenses 34 and 36 with reference to lens holders 16 and lenses 38 and 40 will vary with the applications for which the lens assemblies are intended. Numerous configurations, arrangements and types of lenses may be accommodated in lens assembly 10. A few exemplary configurations, arrangements and types of lenses will be described below.

Figure 3:
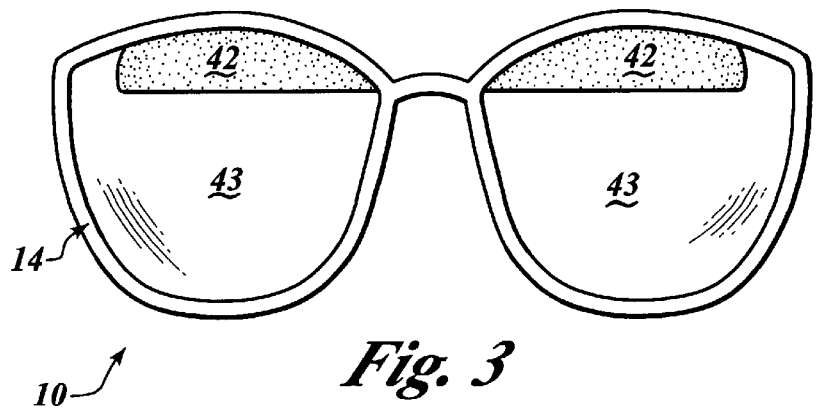
FIG. 3 illustrates a front view of a lens assembly of the present invention comprising composite lenses suitable for individuals who require correction to view materials above eye level, such as painters or telephone linepersons.
Figure 4:
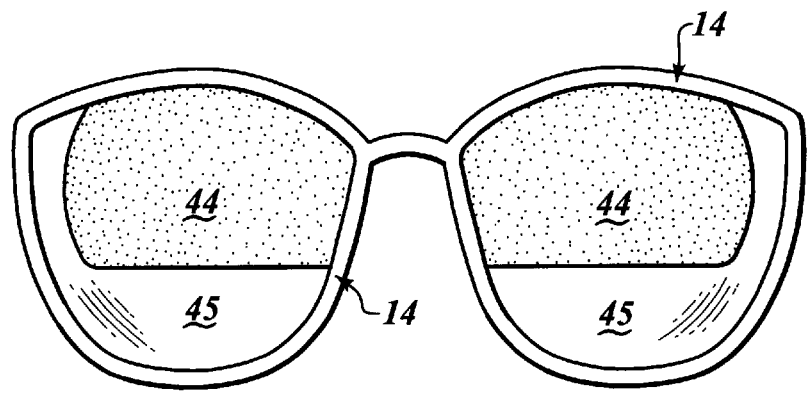
FIG. 4 illustrates a front view of a lens assembly of the present invention comprising composite lenses suitable for individuals who require correction to view materials at eye level or slightly lower, such as computer users.
Figure 5:
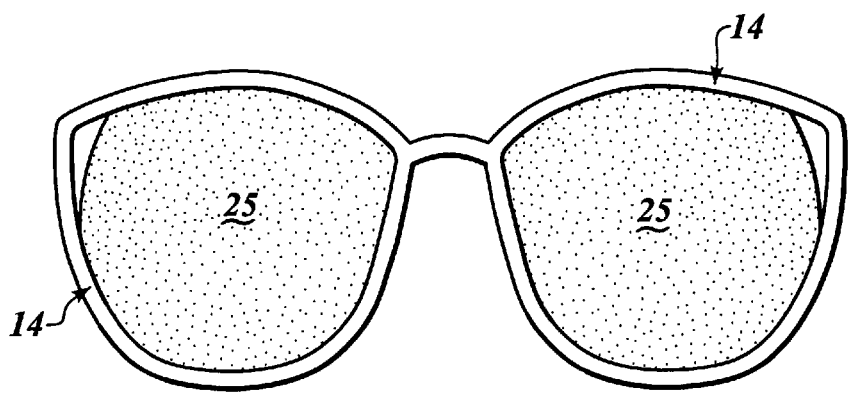
FIG. 5 illustrates a front view of a lens assembly of the present invention comprising lenses with a single correction mounted in a lens frame for specialized, large field applications.

FIGS. 3 and 4 illustrate lens assemblies 10 having corrective lenses of different configurations. In FIG. 3, the configuration and placement of corrective lenses 42 and plano lenses 43 in lens assembly 10 is suitable for use in applications in which the user requires a corrective lens for seeing objects above eye level. Such an arrangement might be used by a painter, a telephone lineman, various medical personnel, or the like. In FIG. 4, the configuration and placement of corrective lenses 44 and plano lenses 45 in lens assembly 10 is suitable for use in applications in which the user requires a corrective lens for seeing objects generally at or slightly below or above eye level. Such an arrangement may be used by a computer user looking at a generally vertical display screen. Corrective lenses may, for example, provide magnification at a specified focal distance representing the distance between the individuals eyeglasses and the computer screen.

FIG. 5 illustrates a lens assembly of the present invention in which corrective lens 25 is a unitary rather than a composite lens. Various types of correction may be provided in such a unitary corrective lens.

Figure 6:
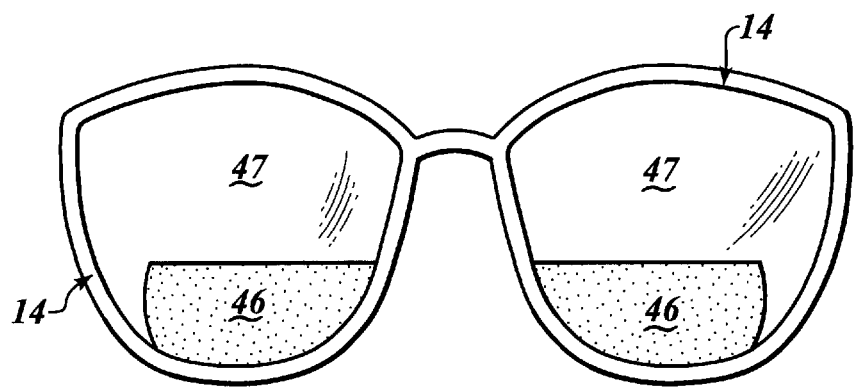
FIG. 6 illustrates a front view of a lens assembly of the present invention comprising composite lenses suitable for individuals who require correction to view materials below eye level, such as for conventional reading applications or for providing additional magnification for close-up work.

FIG. 6 illustrates a lens assembly of the present invention comprising composite corrective lenses in which corrective lenses 46 and piano lenses 47 have a configuration and placement within frame 14 similar to a conventional "bifocal." Lens assemblies having this or a similar configuration may be used for reading or doing "close" work that is generally located below eye level. This lens assembly could be used, for example, to temporarily convert a pair of piano or corrective base eyeglasses to bifocals. Because lens assemblies 10 of the present invention are quickly and conveniently mountable on and detachable from base eyeglasses, they provide enhanced versatility compared to standard bifocals or prior art wet-mount press-on lenses that are difficult to add and remove.

Figure 7:
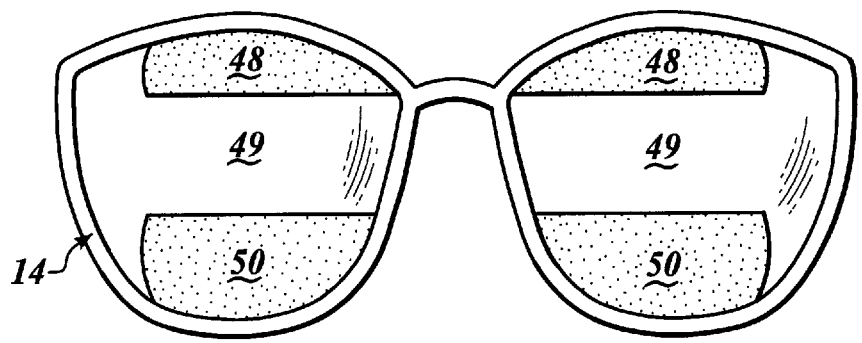
FIG. 7 illustrates a front view of a lens assembly of the present invention comprising composite lenses suitable for individuals who require correction to intermittently view materials both above and below eye level, such as an airline pilot.

FIG. 7 illustrates a lens assembly of the present invention comprising composite corrective lenses in which corrective lenses 48 and 50 are provided in both the upper and lower regions of each lens and separated by piano lenses 49. Corrective lenses 48 and 50 may provide magnification, for example, so that an airline pilot is able to read instrumentation located both above and below eye level. For this type of application, the area of the lens that is not corrective is preferably piano (non-corrective), as piano lenses 49. An individual such as an airline pilot may thus use a pair of base eyeglasses providing correction for seeing at distances, and may mount the detachable lens assembly illustrated in FIG. 7 to base eyeglasses so that he can read the instrumentation during flight preparation and flight. This arrangement provides specialized correction (magnification) at the appropriate locations, while providing the appropriate correction for distance vision generally at eye level.

Figure 8:
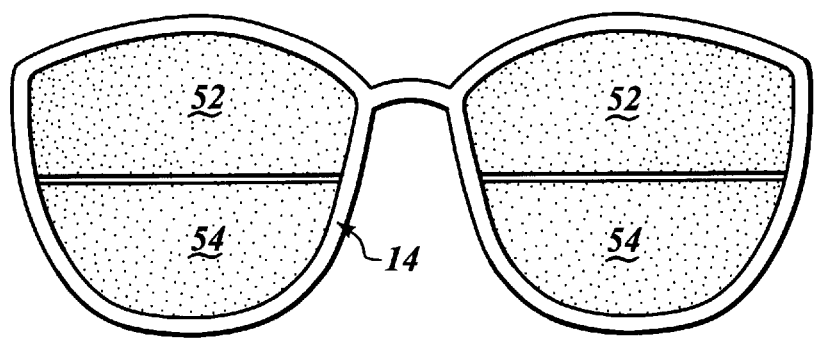
FIG. 8 illustrates a front view of a lens assembly of the present invention comprising composite lenses suitable for individuals who require different correction for viewing materials above and below eye level.
Figure 9:
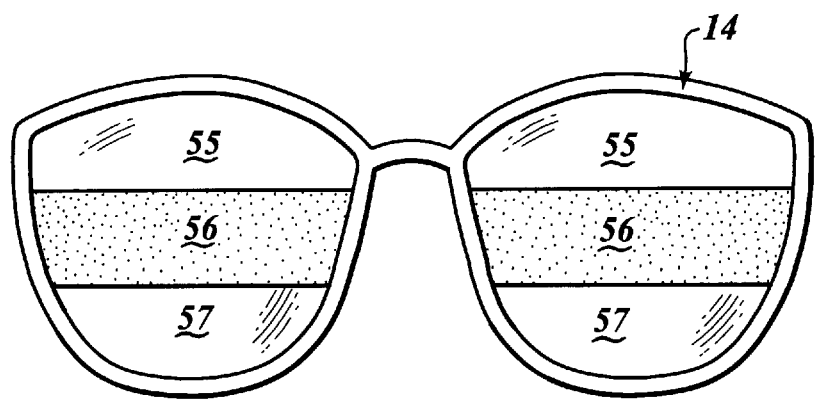
FIG. 9 illustrates a front view of a lens assembly of the present invention comprising composite lenses having correction in a central portion of the lens providing intermediate distance correction for viewing materials generally at eye level.

FIG. 8 illustrates a lens assembly comprising corrective lenses 52 and 54 providing two different corrections in the upper and lower regions, respectively. FIG. 9 illustrates a lens assembly in which corrective lenses 56 are provided in a central portion of the lens between plano lenses 55 and 57. This arrangement provides specialized correction for viewing materials, and is especially suitable for providing intermediate distance correction for viewing materials substantially at eye level.

Many different types and arrangements of corrective lenses may be provided in lens assemblies of the present invention. The embodiments described herein are illustrative only. While many of the corrective lenses have been described as providing magnification, it will be appreciated that a variety of types of visual correction may be provided. It will also be appreciated that the portions of the lenses that have not been described as "corrective" may comprise a piano (non-corrective) lens or may comprise a lens having a correction different from the correction provided in the identified corrective eyeglass lens. The important aspect of the present invention is that such corrective lenses are mounted in a frame to form a lens assembly that is quickly and conveniently attachable to and detachable from a pair of base eyeglasses to modify the correction.

The lens assembly frame similarly may take a variety of forms, provided it is quickly and conveniently attachable to and detachable from a pair of base eyeglasses. Frame 14 was previously described as having a mechanical clip arrangement or a magnetic arrangement for detachably mounting to a pair of base eyeglasses. Other arrangements would also be suitable. FIG. 10 illustrates a frame having a plurality of clips 58 provided on upper rim 15 of frame 14. Clips 58 are preferably designed or encased in a protective material so that they will not scratch or otherwise damage the base eyeglasses, and so that they will not interfere with the individual's field of view. For some applications, a single clip provided on each upper rim may provide sufficient support for mounting the lens assembly on the base eyeglasses. Clips 58 are illustrated as extending "back," enabling the lens assembly to be mounted on the outside of a pair of base eyeglasses. Clips 58 may alternatively extend "out" or "forward," enabling the lens assembly to be mounted on the inside of a pair of base eyeglasses.

FIGS. 11 and 12 illustrate lens assembly frames having alternative mounting arrangements. FIG. 11 shows a lens assembly of the present invention having an alternative type of clip arrangement in which a pinch clip is mounted in proximity to the bridge piece of the lens assembly frame. Pinch clip 60 is mounted on crosspiece 62 and is mountable on lens assembly 10. Clips 64 provide a flip up and flip down feature to the pinch clip mounting assembly. Clips 64 are preferably designed so that they will not scratch or otherwise damage the base eyeglasses, and so that they will not interfere with the individual's field of view. Projections 66 and 68 are biased away from one another in a rest condition, by means of a spring or similar mechanism, resulting in pinching together of ends 70. The inner facing surfaces of ends 70 are preferably provided with a resilient surface that is capable of secure mounting on an object such as the bridge piece of a pair of base eyeglasses. This and other type of pinch clip mechanisms may be used with lens assemblies of the present invention to provide quick and convenient removable attachment to the base eyeglasses.

FIG. 12 illustrates yet another type of attachment arrangement wherein lens assembly is provided with mechanical hooks 72 extending generally laterally. Hooks 72 are designed to fit over and attach to the temple pieces of the base eyeglasses. This arrangement is especially preferred for applications in which the lens assembly is mounted on the "inside" of a pair of base eyeglasses.

Figure 13A:
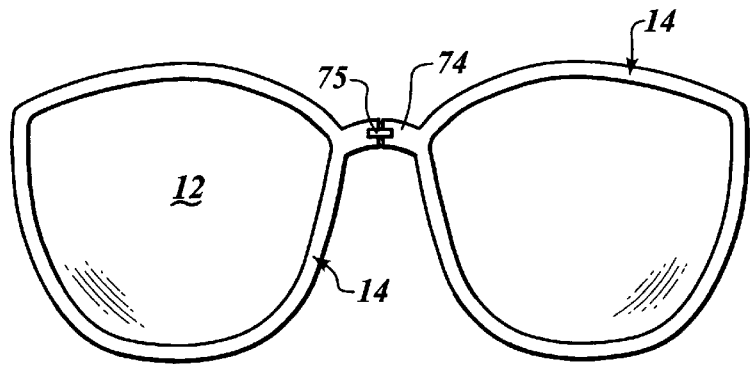
FIGS. 13A and 13B illustrate a front view of a lens assembly of the present invention having a frame hinged at the bridge in an "open" and "closed" position, respectively.
Figure 13B:
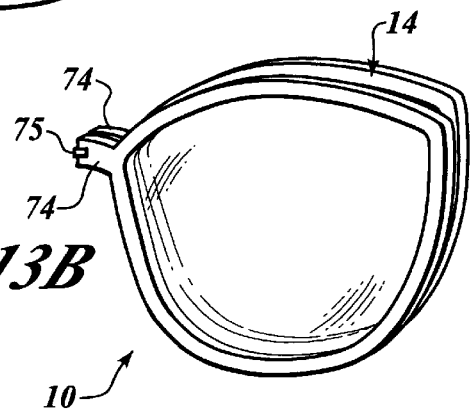

FIGS. 13A and 13B illustrate a preferred embodiment of the lens assembly frame in which the frame is hinged so that the lens assembly may be folded in half for easy and convenient storage when it is not mounted on a pair of base eyeglasses. As shown, bridge piece 74 is provided with a central hinge 75. Hinge 75 preferably has a locking mechanism that positively maintains the frame in an open condition, for example, when the lens assembly is mounted on a pair of base eyeglasses, yet that permits folding of the lens frame for convenient storage.

Figure 14A:
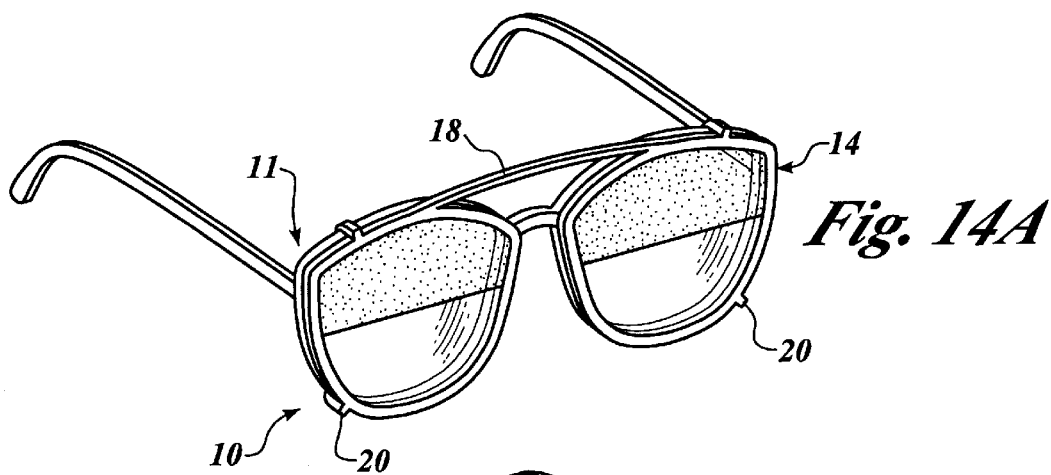
FIGS. 14A and 14B illustrate a perspective view of lens assemblies of the present invention comprising composite corrective lenses mounted to a pair of base eyeglasses using a clip-on frame and a magnetic frame, respectively.
Figure 14B:
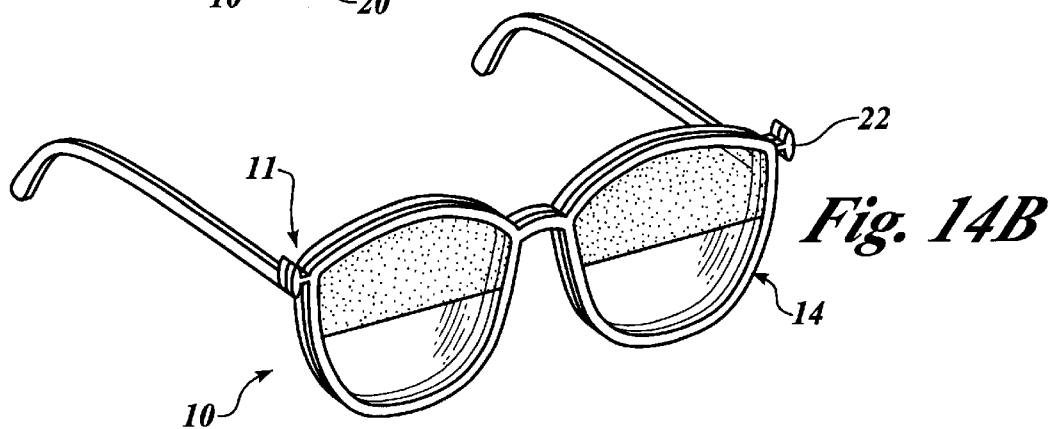

Finally, FIG. 14A schematically illustrates a clip-on lens assembly of the present invention in place on base eyeglasses and FIG. 14B schematically illustrates a magnetic lens assembly of the present invention in place on base eyeglasses 11. As has been described above, many different arrangements of lenses, attachment means, and the like would be suitable for use with the lens assemblies of the present invention. Thus, while the lens assembly of the present invention has been described with reference to certain preferred embodiments thereof, it will be recognized that additional configurations, embodiments and arrangements may be used without departing from the invention.

What is claimed is:

1. A lens assembly comprising: a frame having two lens holders connected to one another by means of a bridge piece; a lens comprising a corrective lens portion in a central and upper location and a different lens portion in a central and lower location, mounted in each of the lens holders; and means for detachably mounting the frame to a pair of base eyeglasses, wherein the lens holders are similar in configuration and dimension to lenses mounted in the base eyeglasses.

2. The lens assembly according to claim 1, wherein the means for detachably mounting the frame to a pair of base eyeglasses comprises two or more mechanical clips.

3. The lens assembly according to claim 1, wherein the means for detachably mounting the frame to a pair of base eyeglasses comprises magnetic means.

4. The lens assembly according to claim 1, wherein the corrective lens mounted in each of the lens holders provides magnification.

5. The lens assembly according to claim 1, wherein the different lens portion mounted in each of the lens holders further comprises a second corrective lens portion.

6. The lens assembly according to claim 1, wherein the different lens portion mounted in each of the lens holders is a plano lens portion.

7. The lens assembly according to claim 1, wherein the corrective lens in each of the lens holders provides magnification.

8. The lens assembly according to claim 1, further comprising a hook extending laterally from each lens holder, each hook adapted for attaching the lens assembly to temple pieces of the pair of base eyeglasses.

9. The lens assembly according to claim 1, wherein the different lens portion comprises a composite lens having a corrective lens in its lower region.

10. The lens assembly according to claim 9, wherein the corrective lenses provide magnification.

11. The lens assembly according to claim 1, wherein the bridge piece is hinged in a central region to provide folding of the frame.

12. The lens assembly according to claim 1, further comprising an extension projecting laterally from each lens holder, each extension adapted for attachment to an eyeglass leash.

13. The lens assembly according to claim 1, wherein the means for detachably mounting the frame to a pair of base eyeglasses comprises a pinch clip located in proximity to the bridge piece of the frame.

14. A lens assembly comprising: a frame having two lens holders connected to one another by means of a bridge piece; a lens comprising a corrective lens portion in a central location and at least one different lens portion in an upper and a lower location, mounted in each of the lens holders; and means for detachably mounting the frame to a pair of base eyeglasses.

15. The lens assembly according to claim 14, wherein the corrective lens portion in the central location provides magnification.

16. The lens assembly according to claim 15, wherein the at least one different lens portion is a plano lens portion.

17. The lens assembly according to claim 14, wherein the at least one different lens portion further comprises a second corrective lens portion.

* * * * *